US012038132B2

(12) United States Patent
Mussot et al.

(10) Patent No.: US 12,038,132 B2
(45) Date of Patent: Jul. 16, 2024

(54) METHOD FOR DETECTING LEAKS IN A PRESSURISED GAS TANK HEAD AND TANK HEAD FOR USE OF SUCH A METHOD

(71) Applicant: AD-VENTA, Châteauneuf-sur-Isère (FR)

(72) Inventors: Jean-Luc Mussot, Loriol sur Drôme (FR); Antoine Joly, Valence (FR)

(73) Assignee: AD-VENTA, Chateauneuf-sur-Isere (FR)

( * ) Notice: Subject to any disclaimer, the term of this patent is extended or adjusted under 35 U.S.C. 154(b) by 909 days.

(21) Appl. No.: 17/052,317

(22) PCT Filed: May 9, 2019

(86) PCT No.: PCT/FR2019/000073
§ 371 (c)(1),
(2) Date: Jun. 23, 2021

(87) PCT Pub. No.: WO2019/220024
PCT Pub. Date: Nov. 21, 2019

(65) Prior Publication Data
US 2021/0239276 A1    Aug. 5, 2021

(30) Foreign Application Priority Data

May 14, 2018   (FR) ...................................... 18/00497

(51) Int. Cl.
*F17C 13/04*    (2006.01)
(52) U.S. Cl.
CPC ...... *F17C 13/04* (2013.01); *F17C 2205/0305* (2013.01); *F17C 2205/0323* (2013.01);
(Continued)
(58) Field of Classification Search
None
See application file for complete search history.

(56) References Cited

U.S. PATENT DOCUMENTS

| 8,225,816 B2 * | 7/2012 | Denis ...................... F16K 1/306 |
| | | 137/613 |
| 2011/0233218 A1 | 9/2011 | Uchimura |

FOREIGN PATENT DOCUMENTS

| EP | 2631460 A1 | 8/2013 |
| EP | 3196533 A1 | 7/2017 |

(Continued)

OTHER PUBLICATIONS

International Search Report for corresponding application PCT/FR2019/000073 filed filed on May 9, 2019; dated Jul. 17, 2019.

*Primary Examiner* — Peter J Macchiarolo
*Assistant Examiner* — Jermaine L Jenkins
(74) *Attorney, Agent, or Firm* — CANTOR COLBURN LLP

(57) ABSTRACT

The invention relates to a head (2) for a tank (1) used to store pressurised gas, comprising, in an integrated manner: at least two components (13₁, 13₂) for treating, distributing and/or shutting off the gas; an upstream connector (20) suitable for being removably attached in a boss (4) of the tank (1); and downstream outlet pipes (21₁, 21₂) suitable for connecting the head (2) to any system using said gas by means of the aforementioned components (13₁, 13₂). According to the invention, each component (13₁, 13₂) comprises at least two sealing devices (14₁, 14₂) defining an intermediate space therebetween, and at least one pipe (12), called tapping pipe, connects each of the intermediate spaces and a common space (8) into which ail the tapping pipes (12) emerge, with an orifice (15) providing a connection between the common space (8) and a gas-detection device (16).

12 Claims, 1 Drawing Sheet

(52) U.S. Cl.
CPC ............... *F17C 2221/012* (2013.01); *F17C 2223/0123* (2013.01); *F17C 2250/043* (2013.01); *F17C 2260/036* (2013.01); *F17C 2260/037* (2013.01)

(56) References Cited

FOREIGN PATENT DOCUMENTS

| | | | |
|---|---|---|---|
| FR | 2034202 | A | 11/1970 |
| FR | 2926871 | A1 | 7/2009 |
| FR | 3003627 | A1 | 9/2014 |
| FR | 2974883 | A1 | 11/2020 |
| WO | 2005042129 | A2 | 5/2005 |
| WO | 2007048955 | A1 | 5/2007 |
| WO | WO-2014154954 | A1 * | 10/2014 ............ F17C 11/005 |

* cited by examiner

METHOD FOR DETECTING LEAKS IN A PRESSURISED GAS TANK HEAD AND TANK HEAD FOR USE OF SUCH A METHOD

The present invention relates to a method for detecting leaks in a pressurised gas tank head having various integrated components, and a tank head for use of such a method.

The technical sector concerned by the invention is the field of manufacturing and use of pressurised gas tank heads, in particular for hydrogen, and methods and devices for detecting gas leaks in such heads, in particular those which integrate various components or members for treating, distributing and/or shutting off this gas, such as fittings, thermal fuses, sensors, regulator parts, valves and/or plugs closing orifices communicating with the outside.

These components or members internal to the tank head are supplied with gas from inside the gas tank on which the head is attached, and each comprise, for security, at least two sealing devices, one being upstream and the other being downstream, which is often the case in equipment for receiving high-pressure hydrogen.

In this field of pressurised gas tank heads, reference can be made, for example, to:
  the Patent FR3003627 from the same applicant as for the present patent application, entitled "pressurised gas tank head" and to which it is useful to refer,
  or the Patent EP1943454 from Air Liquide, entitled "assembly comprising a tank for pressurised fluid and a filling and/or withdrawal control device" and which teaches a filling and distribution head comprising an integrated pre-expansion device (with at least one part located inside the volume of the tank).

In such tank heads, having various integrated components and members, with double sealing, it is difficult, if not impossible, to check the sealing of all the members and components thus integrated, except by using methods and devices which can be implemented when not in operation, such as:
  by wrapping the entire tank and its head with a film making it possible to detect whether there is a leak, such as by calorimetry as taught in the Patent Application WO200542129 from ATMI,
  or by covering the entire tank head by a bell sealing the tank around the head and by detecting the gas which could then escape into this bell as taught by the Patent Application FR2034202 from Primagaz.

The disadvantage is that such methods and devices are quite intrusive and, above all, cannot therefore be used during use of these gas tanks in operation, in other words with their head connected to a circuit for distributing the gas contained in the tank.

Reference could also be made to the Patent Application FR2974883 from Michelin, which teaches a valve, installed on a tank containing pressurised gas, and comprising various components including a regulator, a solenoid valve controlling the supply to the outlet of low pressure gas and a gas leak detector (integrated or not in the valve) making it possible to cut the supply to the solenoid valve and/or to activate an evacuation of gases which have escaped due to the leak, and therefore certainly during use of the gas tank in operation, in other words with the head connected to a circuit for distributing the gas contained in this tank.

The problem posed and the objective of the present invention are therefore to achieve, without the drawbacks of the above-cited devices and without there necessarily being a solenoid valve, a tightness check by leak detection in a pressurised gas tank head having a plurality of integrated components and members, and this on the one hand without having to check each member separately, as could be envisaged but which would be rather complex, and on the other hand even in operation and during the distribution of gas, which is essential especially when the gas is hydrogen and the user must absolutely be warned as soon as there is a leak (which can happen even after a check before use) on a sealing device of one of its integrated components or members.

A solution to the problem posed is a pressurised gas storage tank head suitable for being attached directly and removably on such a tank and which comprises, in an integrated manner, in the body of the head itself, at least two components for treating, distributing and/or shutting off this gas, an upstream connector suitable for being removably attached in a boss of the tank and inside which is located and emerges at least one pipe for supplying the tank head, and downstream outlet pipes suitable for connecting the tank head to any system using said gas through the said components, and according to the invention:
  each component has at least two sealing devices, one being upstream and the other being downstream, which define an intermediate space there between,
  at least one pipe, called tapping pipe, connects each of the said intermediate spaces and a common space into which all the tapping pipes emerge,
  an orifice communicates the common space with a device for measuring the presence of the gas.

The objective of the present invention is also obtained by a method for leak detecting in a pressurised gas tank head such as described above and such that:
  each of said intermediate spaces, defined between each upstream sealing device and each downstream sealing device of all of the components and components integrated in said head, is connected to a common space,
  all the intermediate spaces communicate with the said same common space which initially contains no traces of the said gas,
  the common space communicates with a device for detecting the presence of the said gas,
  the distribution of the gas by the said tank through the said tank head is put into operation,
  if the presence of a gas, which was not there at the start of the operation, is then detected by the detection device during the operation, it is deduced from this that at least one of the sealing devices of one of the said components leaks.

Thus such a leak detection being made before the second sealing device can also leak, such a method and such a device guarantee the security of the atmosphere surrounding the storage tank head, especially when the gas is hydrogen and this atmosphere is confined as in an aeroplane or an underground construction machine.

Moreover, in a particular embodiment in order to avoid, in the event of failure of an upstream seal, common space itself leaking into the atmosphere surrounding the tank head, the leakage gas being able to escape in this common space is evacuated, for example above a predetermined pressure, to any secure zone, or outside the atmosphere surrounding the storage tank head, such as outside the cabin in the case of an aeroplane.

The result is a new method for detecting leaks in a pressurised gas tank head having various integrated components, and a new gas tank head which can use such a method, which responds to the problem posed and to the objective stated above, in particular in uses in confined atmospheres and when the gas used is hydrogen.

Other advantages of the present invention could be cited, but those mentioned above already show enough to prove its interest.

The description below and the attached figures represent an exemplary embodiment of the invention, but are in no way limiting: other embodiments are possible within the scope and extent of this invention as defined by the claims attached below.

Figure 1:
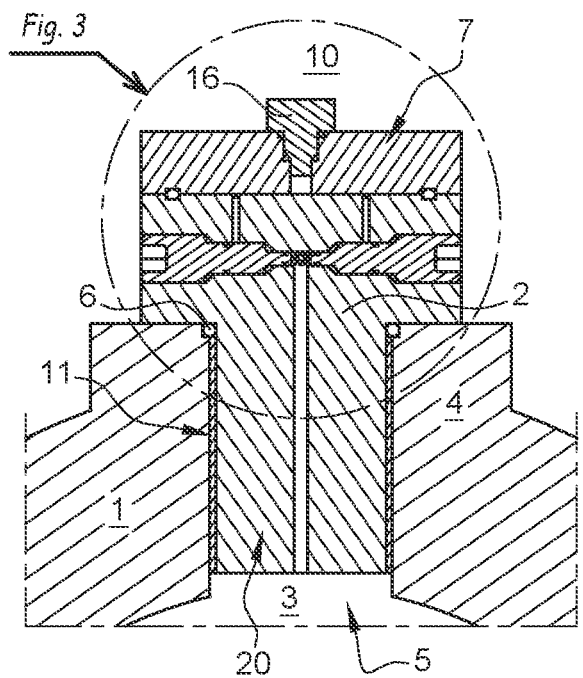
FIG. 1 is a sectional axial view of an exemplary embodiment of a tank regulator head according to the invention.

In the present description, the various components are positioned and qualified by the terms upstream and downstream taken in the direction of flow of the gas, thus from the chamber 3 of the storage tank 1 to the outside 10 of the tank head 2 according to the invention.

This head comprises, in an integrated and compact manner in the same body, which is substantially tubular, e.g. cylindrical with axis XX', and made from compatible material that is gas-tight for gases, such as hydrogen:

at least two components $13_1$, $13_2$ for the treating, distributing and/or shutting off this gas, such as a plug, a fitting, a thermal fuse, a sensor, a regulator part, etc.

an upstream connector 20 suitable for being removably attached, such as by screwing 11, and sealed, using at least one O-ring type circular seal 6 positioned in a groove, in the orifice 5 of a boss 4 of the said tank 1 and inside which is located and emerges at least one gas supply pipe 9 for supplying gas from the storage chamber 3 of the tank, and downstream outlet pipes $21_1$, $21_2$ suitable for connecting the tank head 2 to any system using the said gas once it has passed through the said components $13_1$, $13_2$ from the at least one supply pipe 9, and according to the invention:

each component $13_1$, $13_2$ has at least two sealing devices $14_1$, $14_2$, (one being upstream $14_1$ and the other being downstream $14_2$), which define an intermediate space therebetween, at least one pipe 12, called tapping pipe, connects each of the said intermediate spaces and a common space 8 into which all the tapping pipes 12 emerge, an orifice 15 communicating the common space 8 with a device 16 for detecting the presence of gas, such as a pressure sensor, but this may be any detection means.

The principle of the operation of such a tank head is very well known to a person skilled in the art and will not be explained here, except of course as regards the subject matter of the invention.

Moreover, according to the present invention and in the case where the outside 10 surrounding the tank head 2 is a confined space as in an aeroplane or an underground construction machine, and where it would be dangerous to allow a gas such as hydrogen to leak, the tank head 2 has an evacuation orifice 15 between the common space 8, into which all the tapping pipes 12 emerge, and any pipe (not shown in the figures) connecting the said head 2 and any external secure zone, i.e. outside the atmosphere 10 surrounding the storage tank head, such as the cabin in the case of an aeroplane.

Figure 3:
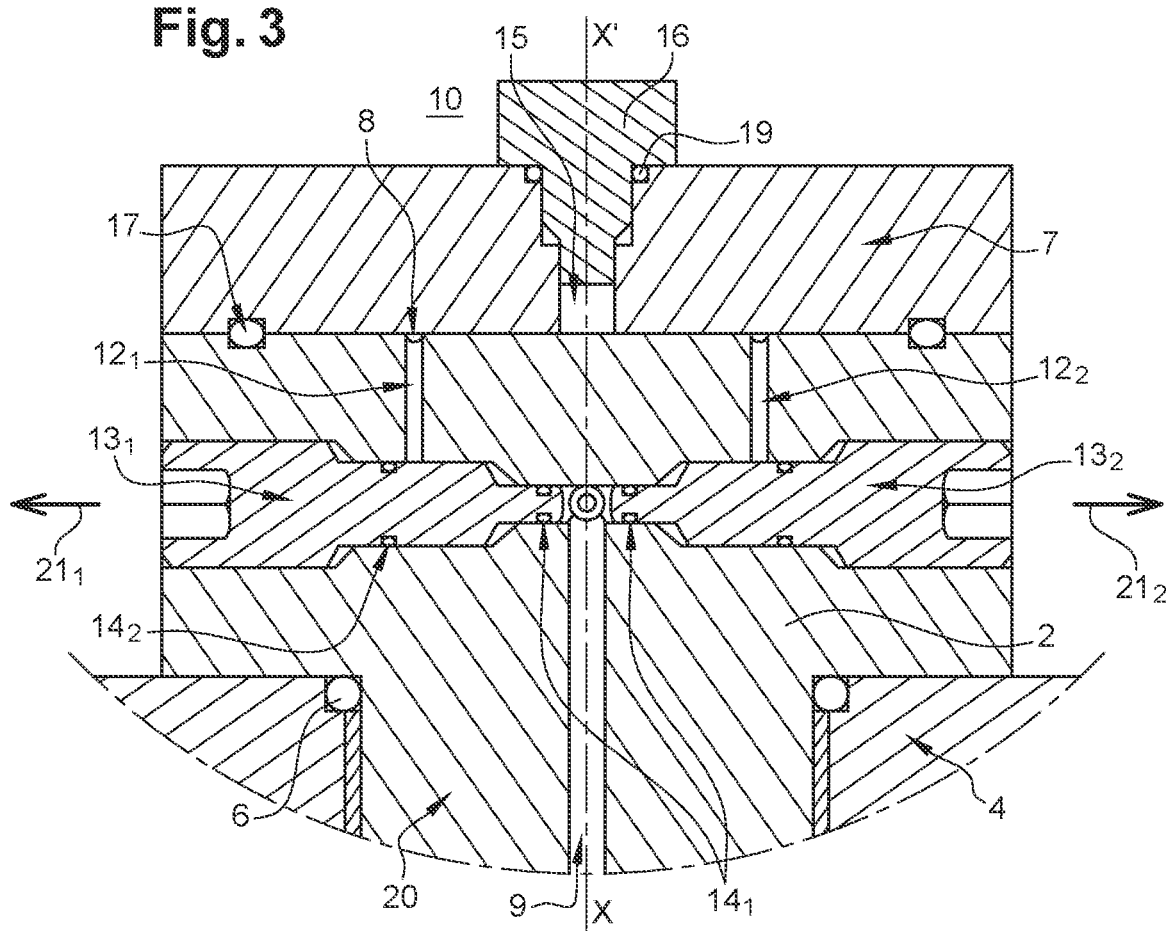
FIG. 3 is an enlarged view of a part of the FIG. 1.

In a preferred embodiment, this evacuation orifice 15 between the common space 8 and any pipe connecting said head 2 is the same orifice as the one, represented in FIG. 3, communicating the common space 9 with the device 16 for detecting the presence of the gas, which is represented here as a plug of this evacuation orifice 15.

In the embodiment of the attached figures, the common space 8, into which all of the tapping pipes 12 emerge, is a circular groove made on the top of the tank head 2 and closed on its upper face by a sealed cover 7.

Figure 2:
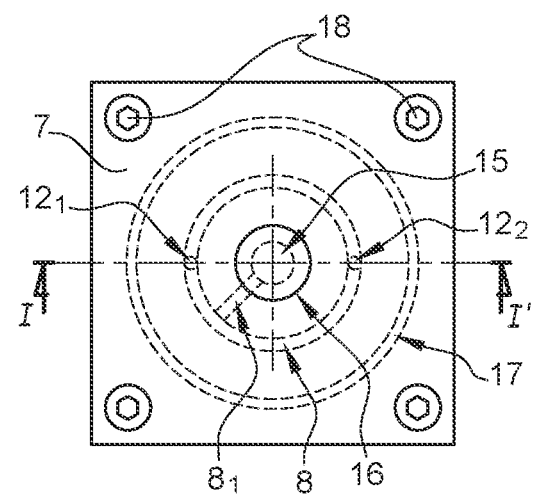
FIG. 2 is a view from the above of the same tank head as in the FIG. 1.

This cover is represented in the FIGS. 1 and 3 as a rather thick part, which may be metal and which is attached, by any means such as four screws 18 shown only in the top view in FIG. 2, in a sealed manner, by means of a circular seal 17 surrounding the common groove 8 on the top of the tank head 2.

This cover 7 comprises at least the orifice 15 making the common space 8 communicate with the device 16 for detecting the presence of the gas which is itself attached, in a sealed manner by means of a seal 19, to the outlet of the said orifice 15 which in this case is specifically a bore made in the thickness of the cover 7.

This cover 7 could also be thinner, or even be a simple moulded plastic lid with, for example, a custom seal which will act as communication channels and common space 8 between the different orifices 12, 15; thus the cover might not withstand the pressure which could increase in the event of a leak in the common space 8, a relief valve could then be provided to evacuate the gas to the outside 10 or through an evacuation pipe to a secure zone as previously indicated.

In another embodiment, this cover 7 could even be made in the same body of the tank head 2 and would then, in this case, constitute only one part with the head body and without a seal: this could then be manufactured, for example:

either directly by 3D printing with all the necessary internal pipes, or by producing the common space 8 and the tapping pipes 12 by bores which must then be partially plugged once they are all communicating together and leaving only one bore unclogged in order to constitute the orifice 15 communicating the common space 8 with the device 16 for detecting the presence of the gas.

Thus, whatever the embodiment of the said tank head 2 according to the invention, when the gas distribution is put into operation by the said tank 1 through this tank head 2, if the presence of a gas, which was not there at the start of the operation, is then detected by the detection device 16 during the operation, it is deduced from this that at least one of the sealing devices $14_1$ of one of the said components 13 leaks, in a particular embodiment, the presence of the gas in the common space 8 is detected by measuring the pressure in this space, then, if this pressure is greater than the external pressure 10 at the tank head, the leaking gas escaping into the common space 8, is evacuated 15 such as via a discharge relief valve when it is measured that the pressure in this space exceeds a given threshold, either to the outside 10 or, depending on the use, through an evacuation pipe to a security zone as previously indicated.

Moreover, depending on the pressure conditions, if it is desired to know whether it is upstream seal of one of the said components 13 which is faulty (which can be the most critical) and not a downstream seal, the doubt can be removed according to one of the following methods:

either a vacuum is created in the common space 8 and the intermediate spaces and, if the pressure in this space becomes the external pressure 10 around the tank head 2 (such as the atmospheric pressure), it is a downstream seal which is faulty, but if, by contrast, this measured pressure becomes greater than the external pressure, it is an upstream seal which is faulty, or this common space 8 is placed under an intermediate pressure between the external pressure 10 and the minimum permissible pressure of the tank, and if the pressure measured in this common space 8 then reduces, it is a downstream seal which is faulty, but if the measured pressure increases, it is an upstream seal which is faulty, or it can be satisfactory to put into this common space 8 a different gas to that contained in the tank (and such as at a pressure equal to the external pressure 10 and in any case less than the one of the gas contained in the tank), and if the presence of the said gas contained in the tank is detected, such as by an increase in the pressure measured in this common space 8, it is deduced that it is an upstream seal of one of said components 13 which is faulty.

The invention claimed is:

1. A method for detecting a leak in a pressurized gas tank head suitable for being directly and removably attached on a tank, the method comprising:
    assembling at least two components for treating, distributing and/or shutting off said gas;
    assembling an upstream connector suitable for being removably attached in a boss of the tank and inside which is located and emerges at least one pipe for supplying the head of the tank from a gas storage chamber of the tank,
    assembling downstream outlet pipes suitable for connecting the tank head to a system using said gas through the said components,
    providing each component with at least two sealing devices, one being upstream and the other being downstream, which define an intermediate space therebetween, and each of said intermediate spaces is connected to a common space,
    communicating all the intermediate spaces with the said same common space which initially contains no traces of the said gas,
    communicating the common space with a device for detecting the presence of the said gas,
    putting into operation the distribution of the gas by the said tank through the said tank head, and
    detecting the presence of a gas, which was not there at the start of the operation, by the detection device during the operation, and deducing that at least one of the sealing devices of one of the said components leaks.

2. The method for detecting leak according to claim 1, wherein a gas different from that contained in the tank is placed in the common space and, if the presence of the gas contained in the tank is then detected therein, then an upstream seal of one of the said components is faulty.

3. The method for detecting leak according to claim 1, wherein the gas is detected in the common space by measuring the pressure in this space.

4. The method for detecting leak according to claim 3, wherein a vacuum is created in the common space and the intermediate spaces, and:
    if the pressure in this space becomes the external pressure around the tank head, then a downstream seal is faulty, but if, by contrast, this measured pressure becomes greater than the external pressure, then an upstream seal which is faulty.

5. The method for detecting leak according to claim 3, wherein the common space is placed under an intermediate pressure between the external pressure and the minimum permissible pressure of the tank, and
    if the pressure measured in this common space drops, then a downstream seal is faulty,
    but if the measured pressure increases, it is then an upstream seal which is faulty.

6. The method for detecting leak according to claim 1, wherein if the pressure in the common space is greater than the external pressure at the tank head, the leaking gas escaping into the common space is evacuated to any secure zone.

7. A head of pressurized gas storage tank suitable for being directly and removably attached on such a tank and which comprises in an integrated manner:
    at least two components for treating, distributing and/or shutting off said gas,
    an upstream connector suitable for being removably attached in a boss of the tank and inside which is located and emerges at least one pipe for supplying the head of the tank, and
    downstream outlet pipes suitable for connecting the tank head to a system using the said gas, through said components, wherein:
    each component has at least two sealing devices, one being upstream and the other being downstream, which define an intermediate space therebetween,
    at least one tapping pipe connects each of the said intermediate spaces and a common space into which the at least tapping pipes emerges,
    an orifice communicates the common space with a device for detecting the presence of gas.

8. The head of pressurized gas storage tank according to claim 7, wherein the device for detecting the presence of the gas is a pressure sensor.

9. The head of pressurized gas storage tank according to claim 7, wherein the tank head has an evacuation orifice, which has an outlet, between the common space, into which all the tapping pipes emerge, and any pipe connecting the said head and any external secure zone.

10. The head of pressurized gas storage tank according to claim 9, wherein the evacuation orifice between the common space and any pipe connecting said head is the same orifice as the one communicating the common space with the device for detecting the presence of the gas.

11. The head of pressurized gas storage tank according to claim 7, wherein the common space, into which all of the tapping pipes emerge, is a circular groove made on the top of the tank head and having an open upper face which is closed by a sealed cover.

12. The head of pressurized gas storage tank according to claim 11, wherein the cover is a metal part attached in a sealing manner on the top of the tank head and including at least one orifice communicating the common space with the device for detecting the presence of the gas, and the detection device is attached to an outlet of the said orifice.

* * * * *